United States Patent [19]

Le Floch et al.

[11] 4,305,046
[45] Dec. 8, 1981

[54] SELECTIVE OPTICAL RESONATOR

[75] Inventors: Albert Le Floch, Rennes; Roger Le Naour, Orvault, both of France

[73] Assignee: Agence Nationale de la Valorisation de la Recherche (ANVAR), Neuilly sur Seine, France

[21] Appl. No.: 54,908

[22] Filed: Jul. 5, 1979

[30] Foreign Application Priority Data

Jul. 12, 1978 [FR] France ............................... 78 20808
Feb. 15, 1979 [FR] France ............................... 79 03849

[51] Int. Cl.³ .................................................. H01S 3/08
[52] U.S. Cl. ........................ 331/94.5 C; 331/94.5 M; 331/94.5 S; 350/397; 350/400; 356/350
[58] Field of Search .................... 331/94.5 C, 94.5 G, 331/94.5 S; 356/350; 350/157, 154, 153

[56] References Cited
U.S. PATENT DOCUMENTS

| 3,466,565 | 9/1969 | Rigrod | 331/94.5 C |
| 3,496,488 | 2/1970 | Fork et al. | 331/94.5 S |
| 3,517,330 | 6/1970 | Doyle et al. | 331/94.5 S |
| 3,560,875 | 2/1971 | Macken . | |
| 3,700,307 | 10/1972 | Glenn | 350/157 |
| 3,824,492 | 7/1974 | Brienza et al. . | |
| 3,864,020 | 2/1975 | Armstrong et al. | 350/157 |

FOREIGN PATENT DOCUMENTS 1450129 of 0000 France .

OTHER PUBLICATIONS

"Dye Ring Laser Narrowing and Tuning Using the Optical Activity Dispersion of Crystal Quartz" by Marotta et al.; *Opt. Comm.*, vol. 13, No. 3, (Mar. '75), pp. 226–230.
"A Method of Constructing a Unidirectional Ring Laser" by Mikaelyan et al.; *Sov. Phys. JETP*, vol. 30, No. 1, (Jan. 1970), pp. 22 & 23.
"High Efficiency Single-Frequency cw Ring Dye Laser" by Jarrett et al.; *Jour. of Opt. Soc. of America*, vol. 68, No. 5, (May 1978), pp. 634–635.
"Wide-Bandwidth Feedback Loop Cuts Jitter in Output of a Commercial cw Dye Laser" by Wu et al.; *Laser Focus*, vol. 13, No. 3, (Mar. '77).
"Laser Frequency Control by Means of Birefringent Crystals" by Lopasov et al., *Opt. and Spect.*, vol. 28, No. 3, (Mar. '70), pp. 291–292.

*Primary Examiner*—William L. Sikes
*Assistant Examiner*—Léon Scott, Jr.

[57] ABSTRACT

Selective optical resonator comprising at least two mirrors and a selective means disposed between two of these mirrors, said means being constituted by:
 an at least partial linear polarization means for the light in a direction P,
 a first birefringent plate having two neutral lines, one forming an angle $\alpha_1 = 0$ with direction P,
 an optically active substance having a birefringence with dispersion and which rotates the light polarization direction by an angle $\theta$ dependent on the wavelength of the $\lambda$ light,
 a second plate which is identical to the first having two neutral lines, one forming the angle $\alpha_2 = \theta$ with the direction P, whereby the resonator is then selective for said wavelength $\lambda$.

4 Claims, 8 Drawing Figures

4,305,046

SELECTIVE OPTICAL RESONATOR

BACKGROUND OF THE INVENTION

The present invention relates to a selective optical resonator and apparatus utilising the same. It is used in optics, particularly in the construction of mono-frequency and/or frequency stabilised lasers.

Numerous selective resonators are known and they are more particularly used in the laser field. They comprise two facing mirrors and between the said mirrors a selective means for giving preference to a particular wavelength. This means can be a prism, a defraction grid, a Fabry and Perot interferometer, etc. Said apparatus can also be considered to fall into the category of optical "filters" in that they give preference to a particular wavelength to the detriment of other wavelengths. This filtering function is particularly evident when the device is used for constituting the resonator of a laser because, in this case, only the radiation having the preferred wavelength is able to oscillate to the exclusion of the others.

Toroidal resonators are also known, which comprise at least three mirrors oriented in such a way that a light beam can be reflected onto the said mirror and travel in a closed path. Generally, two progressive waves form in such resonators with oppostie propagation directions. In the laser art, the toroidal construction has in the case of a Fabry and Perot-type resonator the advantage of propagating a wave which homogeneously saturates the amplifying medium. In the following description, it is assumed that the ring has three points, or in other words the resonator is formed by three mirrors. However, it is obvious that the ring could be of a more complex nature and have for example four points located at the four corners of a rectangle. The same means can be used to make the resonators selective.

BRIEF SUMMARY OF THE INVENTION

The object of the present invention is a "filter" of this type, but which has a certain number of advantages compared with known apparatus and in particular a greater fineness, its band width being below 0.01 Å and being easier to use in the frequency stabilization of lasers.

More specifically, the present invention relates to a selective optical resonator comprising at least two mirrors and a selective means disposed between two of these mirrors, said means being constituted by:
- an at least partial linear polarization means for the light in a direction P,
- a first birefringent plate having two neutral lines, one forming an angle $\alpha_1 = 0$ with direction P,
- an optically active substance having a birefringence with dispersion and which rotates the light polarization direction by an angle $\theta$ dependent on the wavelength of the $\lambda$ light,
- a second plate which is identical to the first having two neutral lines, one forming an angle $\alpha_2 = \theta$ with the direction P, whereby the resonator is then selective for said wavelength $\lambda$.

According to a first embodiment, the birefringent plates are quarter-wave plates and the resonator comprises two facing mirrors.

According to a second embodiment, the resonator is toroidal and comprises at least three mirrors and the birefringent plates are half-wave plates.

BRIEF DESCRIPTION OF THE DRAWINGS

The invention will be described in greater detail hereinafter relative to non-limitative embodiments and with reference to the attached drawings, wherein show.

DETAILED DESCRIPTION OF THE PREFERRED EMBODIMENTS

Figure 1:
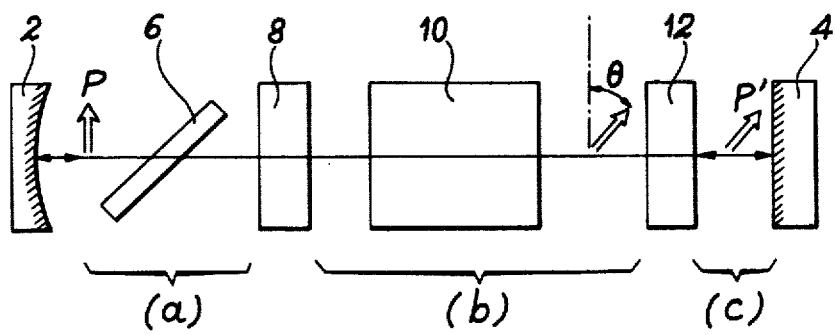
FIG. 1 diagrammatically the means used in the resonator according to a first embodiment of the invention.

In the device according to FIG. 1, between two facing mirrors 2 and 4 is arranged a partial polarizer 6 which, in the present embodiment is an inclined transparent plate, said polarizer firstly gives preference to a linear polarization in a direction P. FIG. 1 also shows a first quarter-wave plate 8, one of whose two neutral lines forms an angle $\alpha_1 = 0$ with the polarization direction P, an optically active substance 10 with a rotary dispersion, the polarization direction of the light being rotated by an angle $\theta$ on passing through said substance and finally a second quarter-wave plate 12, one of whose two neutral lines forms an angle $\alpha_2 = \theta$ with direction P.

For the facility of the description of the operation of the device, a distinction will be made hereinafter between three zones (a), (b) and (c), the first being located between mirror 2 and the first quarter-wave plate 8, the second between the two quarter-wave plates and the third between the second quarter-wave plate 12 and the mirror 4.

A description will firstly be given of the optical state of the system in resonance, i.e. at the filtering wavelength. This state is such that starting from a random point of the resonator where there is a particular electromagnetic field the same field is obtained after an outward and return movement in the resonator. It is readily apparent that the following state corresponds to this condition: in zone (a) there is a linear polarized radiation in direction P which is in the plane of incidence of plate 6. This light radiation reaches the first quarter-wave plate 8 with a polarization directed in accordance with one of the neutral lines of the said plate, so that its polarization is not modified on passing through the plate. In zone (b), the polarization direction of the radiation is rotated by an angle $\theta$ on passing through substance 10. As the latter has a rotary dispersion, the angle $\theta$ is dependent on the wavelength $\lambda$ of the light radiation. The second quarter-wave plate 12 is oriented in such a way that one of its neutral lines forms an angle $\alpha_2 = \theta$ with respect to P, which signifies that this line is parallel to the polarization direction of the incident radiation. This second plate does not therefore affect the polarization, which remains linear in zone (c) and directed in accordance with a direction P'. The radiation is then reflected onto mirror 4.

On return, the radiation passes through the second quarter-wave plate 12 without undergoing rotation, then the optically active substance 10 where it undergoes an opposite rotation of angle $\theta$. The first quarter-wave plate 8 is reached with a polarization parallel to the same neutral line as initially, which reestablishes in the zone (a) a radiation polarized linearly in accordance with direction P.

This special state of the resonator is obtained for the radiation whose wavelength $\lambda$ is such that the rotation $\theta$ imposed by the substance 10 is equal (to within $2K\pi$) to the angle $\alpha_2$ between a neutral line of the second quarter-wave wave plate 12 and the polarization direction P. For a different wavelength of $\lambda$ the angle by which the polarization direction rotates on passing through the substance 10 is no longer equal to $\alpha_2$ in such a way that the second quarter-wave plate 12 receives a light radiation, whose polarization is no longer directed perfectly in accordance with one of the neutral lines. Thus, the vibration on leaving the second quarter-wave plate is no longer directed in accordance with P' and the vibration in zone (a) is no longer directed in accordance with P. In this case, the states of the resonator are two stationary helixes between two quarter-wave plates and two linear polarizations at ±45° in zone (a) and $\alpha_2 \pm 45°$ in zone (c). Thus, the radiation is attenuated by the partial polarizer 6.

Figure 2:
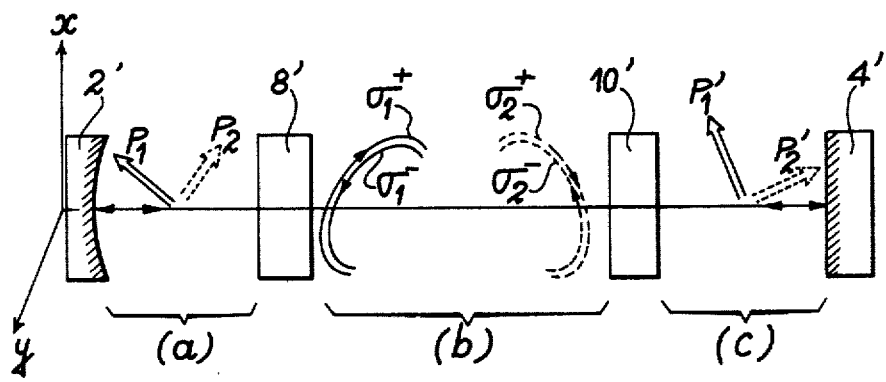
FIG. 2 a prior art device.

To provide a better understanding of the device according to the invention, it can be compared with a similar known construction shown in FIG. 2. The known construction is an optical resonator constituted by two mirrors 4' and 2', a first quarter-wave plate 8' and a second quarter-wave plate 10'. In the plane perpendicular to the axis of the resonator, the directions are indicated by two axes Ox and Oy, axis Ox being in the plane of the drawing. Plate 8' has a slow axis which forms an angle $\alpha_1 = 0$ with Ox and plate 10' a slow axis which forms a random angle $\alpha_2$ with Ox. The three zones defined by the mirrors and the two quarter-wave plates are designated by (a), (b) and (c). Thus, this device only differs from that illustrated by FIG. 1 due to the absence of the partial polarizer and the absence of the optically active substance.

The construction of FIG. 2 has already been studied in connection with the operation of lasers. In this connection, reference can be made to the article published by EVTUHOV and SIEGMAN in the Journal "APPLIED OPTICS," Vol. 4, No. 142, 1965, the note by A. KASTLER in the reports on the Academie des Sciences de Paris, Vol. 271, B999, 1970 and the note by A. LE FLOCH and G. STEPHAN in the reports of the Academie des Sciences de Paris, Vol. 277, B265, 1973.

Without going into detail on the theoretical considerations which make it possible to explain the operation of such a construction (such information being provided in the above-mentioned articles), it can be stated in a simplified manner that such a system has two stationary states. In the first, zone (a) is the seat of a linear polarization, whose direction $P_1$ forms an angle of +45° with the axis Ox. Thus, the radiation falling on quarter-wave plate 8' has a polarization which is oriented at 45° from a neutral line. Thus, in zone (b), a radiation of circular polarization $\sigma_1+$ is obtained. This radiation once again provides a linear polarization in zone (c) after traversing the second quarter-wave plate. The polarization direction $P_1'$ in zone (c) is dependent on the orientation angle $\alpha_2$ of the slow axis of the second quarter-wave plate 10'.

On return, the linear vibration in (c), after traversing the quarter-wave plate 10', gives rise to a circular polarized radiation $\sigma_1-$ inscribed on the same "spiral" as the circular radiation $\sigma_1+$. In this way, a "stationary helix" is obtained between the two quarter-wave plates. After passing through the first quarter-wave plate 8' a linear polarization is again obtained and its direction forms a 45° angle with respect to the axis Ox.

The second stationary state differs from the first only as a result of the fact that in zone (a) the polarization direction $P_2$ is 90° from the first, i.e. at $-45°$ from the axis Ox and as a result the polarization direction $P_2'$ in zone (c) is also displaced by 90° with respect to $P_2$. Between the plates, there are two circular polarizations $\sigma_2+$ and $\sigma_2-$, which are superimposed to give another stationary helix, whose orientation is opposite to that of the first.

These two stationary states correspond to two different frequency modes given by the following formulas:

$$\nu_1 = \left( N + \tfrac{1}{2} + \frac{\alpha_2 - \alpha_1}{\pi} \right) \frac{c}{2L}$$

$$\nu_2 = \left( N + \tfrac{1}{2} - \frac{\alpha_2 - \alpha_1}{\pi} \right) \frac{c}{2L}$$

in which N is an integer, L the length of the resonator, c the speed of light, $\alpha_1$ the angle formed by the slow axis of the first plate 8' with Ox and $\alpha_2$ the angle formed by the slow axis of the second plate with the same axis Ox.

In the case where $\alpha_1 = 0$, the two frequencies of the two stationary states respectively have the value:

$$\nu_1 = \left( N + \tfrac{1}{2} + \frac{\alpha_2}{\pi} \right) \frac{c}{2L}$$

$$\nu_2 = \left( N + \tfrac{1}{2} - \frac{\alpha_2}{\pi} \right) \frac{c}{2L}$$

Figure 3:
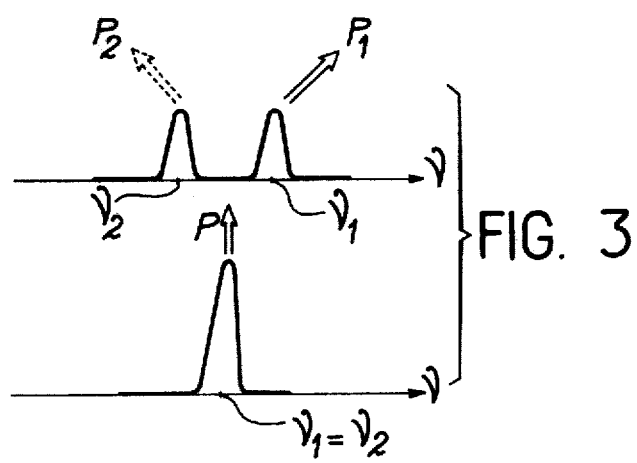
FIG. 3 a frequency diagram permitting a comparison between the two operating modes of the device of the previous drawings.

These two modes are shown on the upper diagram of FIG. 3 in the form of resonance curves representing the known Airy functions. A linear polarization $P_1$ at +45° relative to axis Ox corresponds to frequency $\nu_1$ and a linear polarization $P_2$ oriented by $-45°$ relative to Ox corresponds to frequency $\nu_2$. When angle $\alpha_2$ becomes 0 the above formulas indicate that the two frequencies $\nu_1$ and $\nu_2$ are identical.

Thus, the inventors have shown that the two stationary states can no longer be discerned and merge into a single state, which was not noticed by the above-mentioned authors (cf Article of V. EVTUHOV and A. E. SIEGMAN). Thus, the resonator is perfectly isotropic and the two stationary helixes disappear, which can give rise to a linearly polarized radiation and which is consequently of double amplitude. This is the case shown in the lower diagram of FIG. 3.

Thus, the similarity between the known construction and that according to the invention makes it possible to define the operation of the latter. When the wavelength $\lambda$ is such that the rotation angle introduced by the optically active substance is precisely equal to the angle $\alpha_2$ formed by one of the neutral lines of the second quarter-wave plate with one of the neutral lines of the first plate there is a linear polarization arrangement throughout the resonator. This corresponds to the case where $v_1=v_2$ in the prior art construction. Two stationary states having two different frequencies and two polarizations of different directions in zone (a) are obtained for any other wavelength. This corresponds to the case where $v_1 \neq v_2$ in the prior art construction. The existence of a linear polarization means in zone (a) necessarily leads to losses for radiations corresponding to said two separate stationary states.

In the above description, the device according to the invention has comprised a partial polarizer because the light received by the filter is a priori in a random polarization state. This polarizer can, as illustrated, comprise an inclined plate, but in a more generally manner it may comprise any means leading to anisotropic losses in the resonator, the losses being minimal for radiation polarized in direction P. In certain applications, the resonator is used with a laser emitting an already linearly polarized radiation. It is obvious that the partial polarizer then becomes unnecessary. This is more particularly the case when the device according to the invention is used for detecting emission frequency variations of a laser according to an embodiment illustrated in FIG. 4.

In this drawing, a monomodal (monofrequency) laser 20 emits radiation 22 which passes through a polarizer 24 and gives rise to radiation 26 polarized linearly in direction P. A selective resonator 28 according to the invention is placed at the output of polarizer 24. It comprises two mirrors 2 and 4, preferably having a confocal configuration, two quarter-wave plates 8 and 12 and an optically active medium 10. If the emission wavelength of laser 20 precisely corresponds to the isotropic resonance state of resonator 28 at the output of the latter a radiation 30 is obtained which is linearly polarized in direction 3'. An analyser 32 is placed at the output of resonator 27, its orientation being regulated to 90° of direction P'. A detector 34 is placed to the rear of analyser 32 and is connected by a feedback loop 36 to laser 20.

The device functions in the following manner. When the laser emits radiation, whose wavelength corresponds to the isotropic resonance state of the resonator the detector receives no light because the latter is blocked by analyser 32. If there is a fluctuation in the frequency of the monomodal laser 20 (for example under the action of a temperature change in the ambient medium) radiation 30 from resonator 28 will have a component which can traverse the polarizer 32 and reach detector 34. The signal supplied by the detector is utilized in such a way that the feedback loop 36 supplies a signal which returns the frequency to its correct value. It is known that such a loop can be formed by shaping and amplifying circuits and by a mirror support made from a piezoelectric material.

Figure 4:
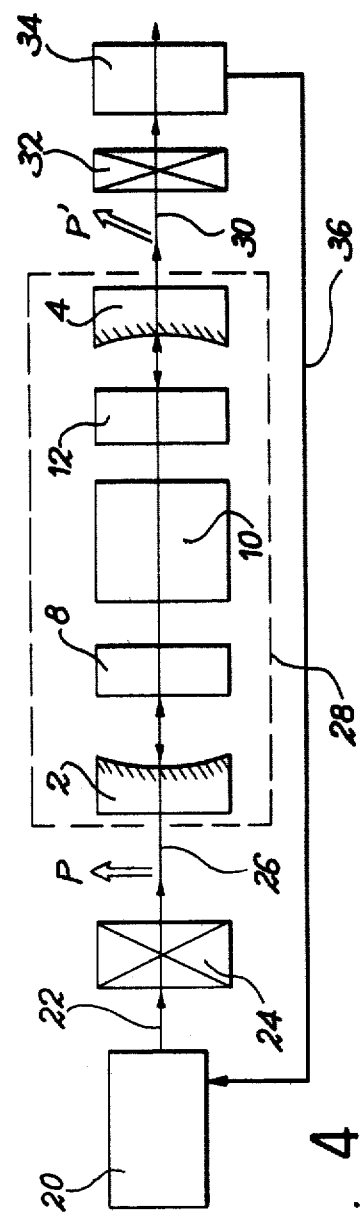
FIG. 4 diagrammatically the use of the resonator according to the invention in the frequency stabilization of a laser.

The device of FIG. 4 can also operate dynamically by modulating the angle $\alpha_2$ or by using an electrooptical element of the Pockels or Kerr cell type placed in zones (a) or (c) of the resonator. This modulation brings about a modulation of the signals supplied by the detector, whose measurement is made possible by synchronous detection means in order to return the emission frequency of the laser to be appropriate value.

It is clear that in such systems, the frequency reference is imposed by the substance having the rotary dispersion phenomenon fixed at $\alpha_1$ and $\alpha_2$, said phenomenon not being sensitive to the position of said substance, unlike in the case of Fabry and Perot interferometer filters where the selected frequency is dependent on position variations of the elements. This independence with respect to positional variations is one of the advantages of the construction according to the present invention.

Figure 5:
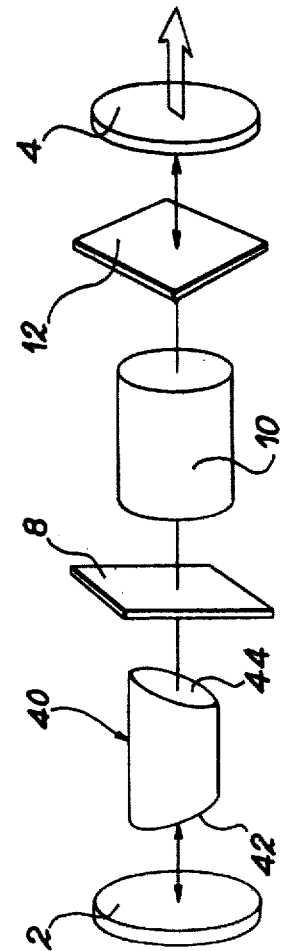
FIG. 5 the structure of a monofrequency laser utilising the resonator according to the first embodiment of the invention.

FIG. 5 shows an optical device in the form of a monofrequency laser utilising the resonator according to the invention. This device comprises an amplifying medium 40 closed at its two ends by two windows 42 and 44 matched to the Brewster incidence and a resonator according to the invention constituted by two mirrors 2 and 4 between which is positioned at first quarter-wave blade 8, whereof a neutral axis is in the plane of incidence of windows 42 and 44, an optically active crystal 10 and a second quarter-wave plate 12, whose neutral line forms an angle $\alpha_2$ with the plane of incidence. Angle $\alpha_2$ is equal to the polarization rotation angle $\theta$ imposed by crystal 10 for the operating wavelength $\lambda$ of the laser. The radiation supplied by the laser is linearly polarized and has a wavelength $\lambda$. The distance between mirrors 2 and 4 is selected so as to be sufficiently short for there to be only a single resonance mode in the range of frequencies corresponding to the amplification profile of medium 40.

On rotating the quarter-wave plate 12, angle $\alpha_2$ is changed and therefore the wavelength for which the rotation angle $\theta$ on traversing crystal 10 is equal to said angle $\alpha_2$. In this way, a laser with a reconcilable frequency is obtained.

For illustration purposes, it is possible to reproduce a filter according to the invention by using as the optically active medium a paratellurite crystal of formula $TeO_2$. With such a crystal and a length of 4 cm the optical activity is very high, i.e. 24000° and at 4000 Å, but dropping to 10000° at 4500 Å, which represents a dispersion of about 28°/Angstrom. A 2° variation in the optical activity or, and this comes back to the same thing, a rotation of 2° of the second quarter-wave plate is sufficient to completely separate the two Airy functions associated with the two helix modes (FIG. 3, upper line). This corresponds to a fineness resonator 45. Naturally, in the case where the resonator does not form an integral part of a laser there is no need to completely separate the two Airy functions for extinguishing the laser. A 0.2° variation is sufficient in most cases. This angular variation corresponds to a filter of width 0.007 Å, i.e. approx. 1000 MHz at 4500 Å. As the rotary dispersion increases on gaining ultraviolet the performance of the filter according to the invention is further improved in this zone. Thus, the filter according to the invention is finer than conventional filters (for comparison a Lyot filter with 3 plates has a pass band of approx. 0.3 Å).

In the above description, the optically active substance acted on a circular vibration and as a result is placed in zone (b) between the two quarter-wave plates. However, it would not involve passing beyond the scope of the invention to use a substance having a birefringence at x and y with dispersion (in other words a linear as opposed to a circular birefringence), the substance then being placed in zones (a) or (b).

The second embodiment of the invention in which the resonator has a toroidal shape will now be described.

Figure 6:
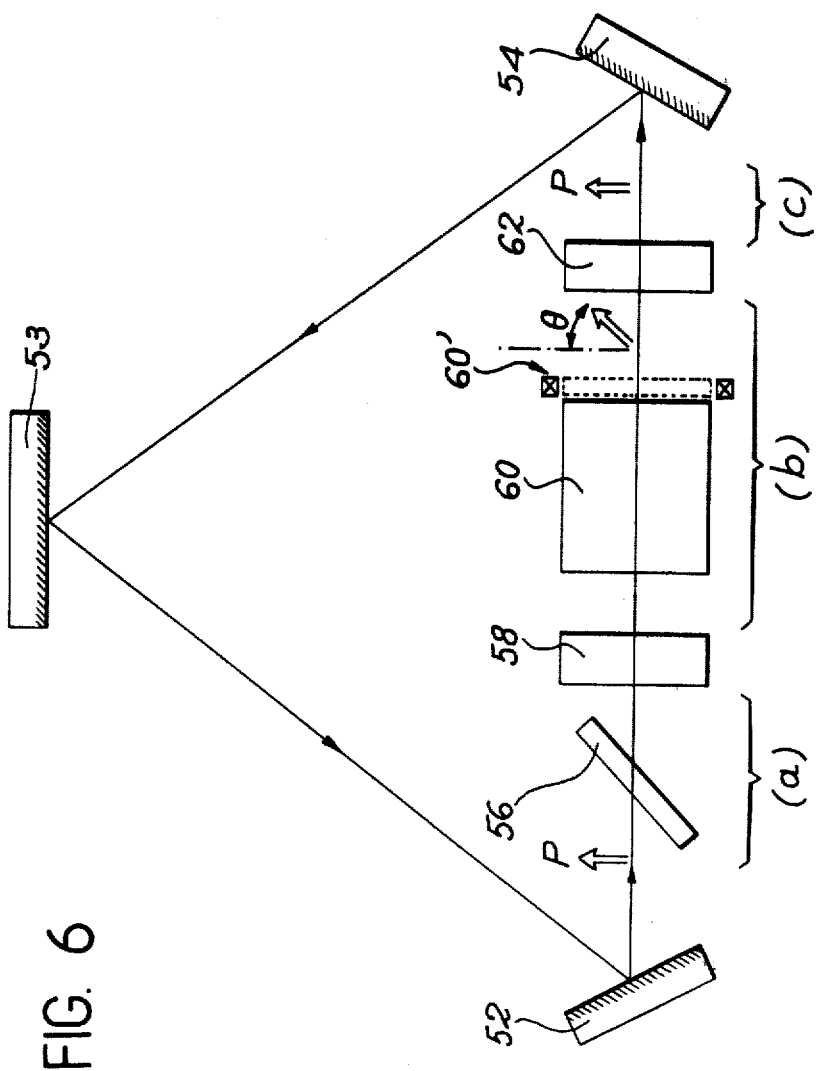
FIG. 6 diagrammatically, the means used in the toridal resonator according to a second embodiment of the invention.

The device shown in FIG. 6 comprises three mirrors 52, 53 and 54 defining a toroidal resonator. Between the two mirrors 52 and 54 are successively placed a partial polarizer 56 which, in the present embodiment, is an inclined transparent plate, said polarizer aiding a linear polarization in direction P, a first half-wave plate 58, one of whose two neutral lines forms an angle $\alpha_1 = 0$ with polarization direction P, an optically active substance 60 having rotary dispersion, whereby on passing through the light undergoing a polarization direction rotation of angle $\theta$, and finally a second half-wave plate 62, one of whose two neutral lines forms an angle $\alpha_2 = \theta/2$ with direction P. For the facility of the description of the operation of this device a distinction is made between mirrors 52 and 54 of three zones (a), (b) and (c), the first being between mirror 52 and the first half-wave plate 58, the second between the two half-wave plates and the third between the second half-wave plate 62 and mirror 54.

A description will firstly be provided of the optical state of the system on resonance, i.e. at the filtering wavelength. This state is such that, starting from a random point of the resonator where there is a particular electromagnetic field, the same field is obtained again after a complete rotation in the resonator.

When in zone (a) the radiation is polarized linearly in accordance with direction P located in the incidence plane of plate 56, said radiation reaches the first half-wave plate 58 with a polarization which is directed in accordance with one of the neutral lines of said plate and whose polarization is not modified on passing through the plate. In zone (b) the polarization direction of the radiation is rotated by an angle $\theta$ on passing through substance 60. As the latter has a rotary dispersion angle $\theta$ is dependent on the wavelength $\lambda$ of the light radiation. The second half-wave plate 62 is oriented in such a way that one of its neutral lines forms an angle $\alpha_2\theta/2$ with P, which signifies that the second plate rotates the polarization direction by an angle equal to $-2 \cdot \theta/2 = -\theta$, thus precisely compensating the rotation imposed by the active substance. The radiation is then reflected onto mirror 53 and then onto mirro 54, whereby in zone (a) there is a linear polarization in direction P, which is the same as that initially. It is thus the resonant or characteristic state of the system.

This state of the resonator is obtained only for the radiation whose wavelength $\lambda$ is such that the rotation $\theta$ imposed by substance 60 is equal (to within $2K\pi$) to the angle $2\alpha_2$ between a neutral line of the second half-wave plate 62 and the polarization direction P. For any other wavelength, the angle by which the polarization direction rotates on passing through substance 60 is no longer equal to the angle $2\alpha_2$ in such a way that the second half-wave plate no longer makes good the rotation imposed by the active substance. Thus, on leaving the second half-wave plate the vibration is no longer directed in accordance with P and, after reflection on mirror 53, the vibration in zone (a) is no longer directed in accordance with P.

Figure 7:
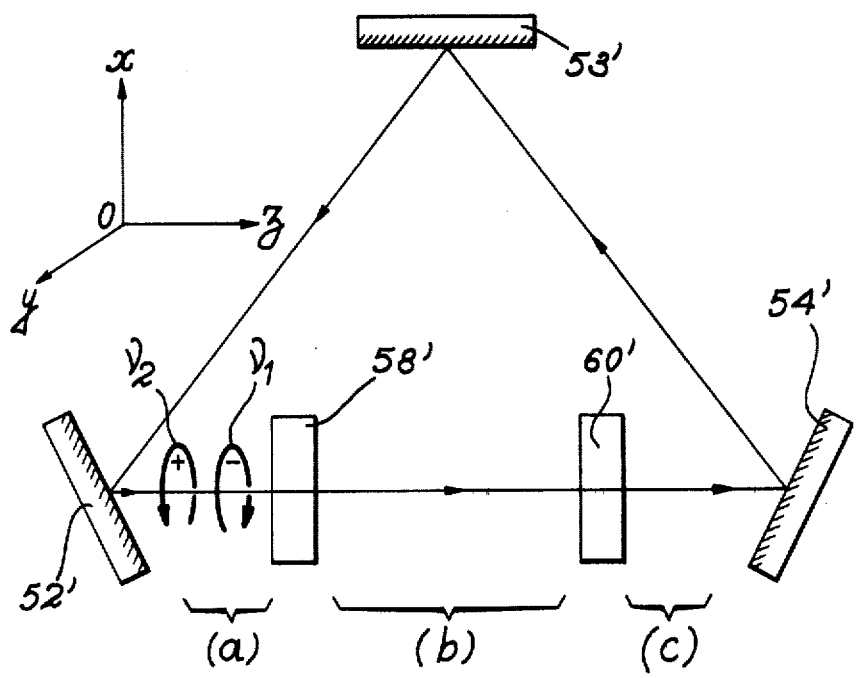
FIG. 7 a simplified device facilitating the understanding of its operation.

Thus, in this case, the characteristic state of the resonator is not a linear polarization state at its wavelengths. It is possible to show that there are in fact two characteristic states for which the radiation has respectively right-handed and left-handed circular polarizations. To demonstrate this, it is possible to consider a construction similar to that of the invention but of a simpler nature and which is shown in FIG. 7.

It is an optical resonator comprising three mirrors 52', 53' and 54', a first half-wave plate 58' and a second half-wave plate 60'. The directions are indicated by the two axes Ox and Oy, the Ox axis being in the plane of the ring, which is in this case the drawing plane. Plate 58' has a slow axis which forms an angle $\alpha_1 = 0$ with Ox and plate 60' has a slow axis which forms a random angle $\alpha_2$ with Ox. The three zones defined by the mirrors and the two plates are designated by (a), (b) and (c). This device only differs from that of FIG. 6 through the absence of partial polarizer 56 and the absence of the optically active substance 60.

In order to find the stationary characteristics states of such a toroidal construction, it is necessary to record the resonant condition for the field which on starting from one point of the resonator and effecting a complete turn and on considering all the transformations undergone by this field on each passage through an optical element or reflection on a mirror must lead back to the initial field.

It should be noted that, with the exception of the Perot and Fabry-type resonator of the first embodiment each element only fulfils its function here on one occasion as a result of the loop formed by the optical path. Thus, two cases occur:

(1) $\alpha_1 = 0$ and $\alpha_2 = 0$: the field which at a has a linear polarization in accordance with $\overrightarrow{Ox}$ is a proper vector, said field passes through the different elements without change and is identical after a complete rotation. The same occurs with the linear polarization field in accordance with $\overrightarrow{Oy}$, but in this case it is assumed that the corresponding wave is "extinguished" by large losses introduced by an inclined plate such as 6 in such a way that only its first state is of interest.

(2) $\alpha_1 = 0$ and $\alpha_2$ random: the wave having linear polarization in zone (a) traverses plate 58' without change, then undergoes a $-2\alpha_2$ rotation on passing through the second half-wave plate 60'. It cannot return to a with the same polarization as initially. Therefore, the linear polarization is no longer a proper vector. A simple calculation shows that on this occasion, the proper vectors in zone a are two left-handed and right-handed circular vibrations. Thus, on considering the right-handed circular vibration at a, the passage through the first plate 58' transforms it into a left-handed circular vibration, which is made right-handed again by the second plate 60' as initially.

Thus, in a toroidal resonator like that in FIG. 7, the case $\alpha_1 = \alpha_2 = 0$ constitutes a special case where the characteristic circular polarizations states become degenerated and a polarization of the system is not then defined. A small anisotropy of losses favouring the axis $\overrightarrow{Ox}$ then imposes a linear vibration along this axis. If the first plate 58' is positioned in such a way that $\alpha_1 = 0$ and on rotating the second plate 60' the circular vibrations oscillating at different frequencies dependent on $\alpha_2$ disappear suddenly if $\alpha_2$ passes through 0 to give a linear polarization. There is therefore a switching over of the characteristic states for this special arrangement. It is this switching over which is used in the filter according to the second embodiment of the invention.

Returning now to the device of FIG. 6, it can be seen that in the general case of a random orientation of the half-wave plates 58 and 62, the active element 60 is traversed by left-handed and right-handed circular waves carrying the different symbols $n^+$ and $n^-$.

Figure 8:
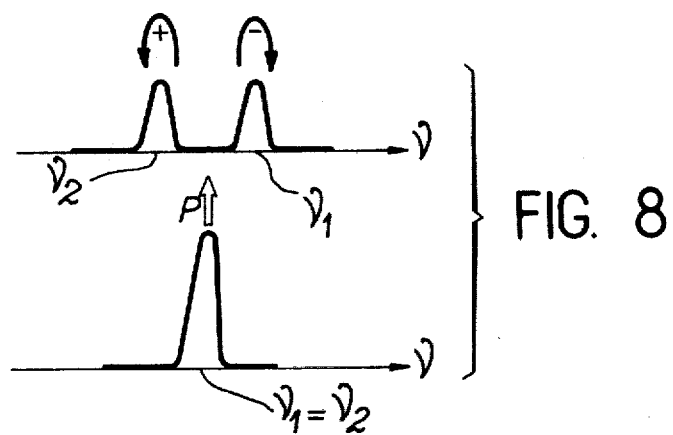
FIG. 8 a frequency diagram making it possible to compare the two operating modes of the device of the previous drawing.

The two stationary states of right-handed and left-handed polarization correspond to two different frequency modes. In the special case where $\alpha_1=0$ these two frequencies vary respectively relative to the simple frequency in accordance with $$\pm(\alpha_2/\pi+\theta/2\pi)\,c/2L$$

in which $\theta$ is the rotation due to the optical activity for a given wavelength, whilst L stands for the half-perimeter of the ring. These two modes are shown on the upper diagram of FIG. 8 in the form of resonance curves representing the known Airy functions. With angle $\alpha_2$ equal to $-\frac{1}{2}\theta$, the above formulas indicate that the two frequencies merge into one. Thus, the two states are merged and can give rise to a linearly polarized radiation, which is then of double amplitude. This special case is obtained for the resonator without elements having an optical activity. This case is shown in the lower diagram of FIG. 8. Thus, in summarising, when the wavelength $\lambda$ is such that the rotation introduced by the optically active substance is exactly equal to double the angle $\alpha_2$ formed by one of the neutral lines of the second half-wave plate with one of the neutral lines of the first plate, a wave with linear polarization is obtained throughout the toroidal resonator. For any other wavelength, two stationary states are obtained having two different polarizations and right-handed and left-handed circular polarizations. Thus, the function of the linear polarizations in zone (a) is to introduce losses for these circular polarization radiations and consequently to give preference to linear polarization radiation which is not attenuated.

As for the first embodiment, the polarization means can comprise an inclined plate (as illustrated in FIG. 6) but in more general terms it can be any means able to produce anisotropic losses in a resonator, said losses being minimal for a radiation polarized in direction P. However, in certain applications the toroidal resonator according to the invention is used for filtering an already linearly polarized radiation. The polarizer then becomes unnecessary. This is the case for example, when the device according to the invention is used for detecting and making good the emission frequency variations of the laser in a utilization like that illustrated by FIG. 4. Naturally, the selective resonator according to the second embodiment can be used to form a monofrequency laser in the same way as that illustrated in FIG. 5. The same substances can be used in the second embodiment as in the first. However, it should be noted that crystals are not the only substances which can be used. Thus, as in a torodial resonator each element is only traversed once during a complete rotation, unlike in a Perot and Fabry-type resonator where the elements are traversed twice, it is possible to use as the active substances a body of Faraday rotation. It is possible to use, for example, a sodium vapour in the vicinity of the absorption lines. The wavelength regulation can then be obtained by acting on the magnetic field applied to the vapour.

The use of a substance with the Faraday effect can be combined with the use of a crystal having an optical activity, the first giving a small rotation of about 1° and permitting the imposition of a rotation direction, whilst the second causes a large rotation determining the wavelength. This combination of two active means is shown in FIG. 6 by crystal 60 and substance 60' having a Faraday effect. Thus, for a first rotation direction about the ring, the combined action of the two substances 60 and 61 is the sum of the optical activity of substance 60 and the Faraday rotation of substance 60', whilst for the other rotation direction the combined action is equal to the difference of these two effects. If the angle $\alpha_2$ of the second half-wave plate is linked with the first rotation, this will not be the case for the second. Only the wave having the wavelength corresponding to said first rotation can consequently oscillate in the ring. Consequently, for the second wave, there is a change from the linear polarization into circular polarizations which are extinguished.

The invention is not limited to the embodiments described and represented hereinbefore and various modifications can be made thereto without passing beyond the scope of the invention.

What is claimed is:

1. A selective optical resonator comprising, successively aligned in a direction of alignment:
   a first mirror having its surface perpendicular to said alignment direction;
   a means for linearly polarizing a light beam from a light source in a selected polarization direction (P) perpendicular said direction of alignment;
   a first quarter-wave plate having two neutral lines, one coinciding ($\alpha_1=0$) with said selected direction (P);
   at least one transparent body of a substance paratellurite crystal having the property of rotating the polarization direction of said light beam by an angle ($\theta$) dependent on the wavelength ($\lambda$) of said light beam, for producing rotation of the polarization direction of said light beam by a predetermined amount ($\alpha_2$) for a predetermined wavelength of said light beam;
   a second quarter-wave plate having two neutral lines, one forming an angle ($\alpha_2$) with said selected direction (P), and
   a second mirror having its surface parallel to the surface or aperture of said first mirror,
   whereby said polarizing means promotes resonance for light of a wavelength ($\lambda$) for which said wavelength dependent angle ($\theta$) equals the angle ($\alpha_2$) between said one neutral line of said second quarter-wave plate and said selected direction (P) by providing relatively greater attenuation of light of other wavelengths of the same order of magnitude.

2. A selective optical resonator comprising, successively in a direction of alignment
   a first mirror having its surface out of parallelism with said direction of alignment;
   a means for linearly polarizing a light beam from a light source in a selected polarization direction (P) perpendicular to said direction of alignment;
   a first half-wave plate having two neutral lines, one coinciding ($\alpha_1=0$) with said selected direction,
   at least one transparent body of a substance having the property of rotating the polarization direction of said light beam by an angle ($\theta$) dependent on the wavelength ($\lambda$) of said light beam and having a Faraday effect, for producing rotation of the polarization direction of said light beam by a predetermined amount ($2\alpha_2$) for a predetermined wavelength of said light beam;
   a second half-wave plate having two neutral lines, one forming an angle ($\alpha_2$) with said selected polarization direction (P); and a second mirror having its surface out of parallelism to the surface of said first mirror;

said resonator further comprising at least one additional mirror, all of said mirrors being relatively, positioned and oriented so as to provide a closed path for said light beam;

whereby said polarizing means promotes resonance for light of a wavelength ($\lambda$) for which said wavelength dependent angle ($\theta$) equals twice the angle ($\alpha_2$) between said one neutral line of said second half-wave plate and said selected direction (P) by providing relatively greater attenuation of light of other wavelengths of the same order of magnitude.

3. A selective optical resonator comprising, successively aligned in a direction of alignment:

a first mirror having its surface out of parallelism with said direction of alignment;

a means for linearly polarizing a light beam from a light source in a selected polarization direction (P) perpendicular said direction of alignment;

a first half-wave plate having two neutral lines, one coinciding ($\alpha_1=0$) with said selected direction;

a first transparent body having a Faraday effect and a second transparent body which is a birefringent crystal having the property of rotating the polarization direction of said light beam by an angle ($\theta$) dependent on the wavelength ($\lambda$) of said light beam and having a Faraday effect, for producing rotation of the polarization direction of said light beam by a predetermined amount ($2\alpha_2$) for a predetermined wavelength of said light beam;

a second half-wave plate having two neutral lines, one forming an angle ($\alpha_2$) with said selected polarization direction (P); and a second mirror having its surface out of parallelism to the surface of said first mirror;

said resonator further comprising at least one additional mirror, all of said mirrors being relatively positioned and oriented so as to provide a closed path for said light beam;

wherein said polarizing means promotes resonance for light of a wavelength ($\lambda$) for which said wavelength dependent angle ($\theta$) equals twice the angle ($\alpha_2$) between said one neutral line of said second half-wave plate and said selected direction (P) by providing relatively greater attenuation of light of other wavelengths of the same order of magnitude.

4. A device for measuring a wavelength difference between a wavelength of a light beam and a predetermined wavelength value ($\lambda$), comprising a selective resonator according to claim 1 or claim 2, said resonator being disposed so as to receive said light beam and to deliver a light beam having a linear polarization parallel to a given direction (P') perpendicular to said direction of alignment and different from said selected direction (P) when the wavelength of said light beam is equal to said wavelength value ($\lambda$), direction (P'), an analyzer being disposed for receiving the beam delivered by the selective resonator and a photodetector, positioned behind the analayzer for delivering a signal which is a measure of said difference.

* * * * *